United States Patent [19]

Rettore et al.

[11] 4,006,126
[45] Feb. 1, 1977

[54] PROCESS FOR THE CHLORINATION OF VINYL POLYMERS

[75] Inventors: Roberto Rettore, Treviso; Giorgio Gatta, Mestre (Venice), both of Italy

[73] Assignee: Montecatini Edison S.p.A., Milan, Italy

[22] Filed: Feb. 17, 1970

[21] Appl. No.: 12,896

Related U.S. Application Data

[63] Continuation of Ser. No. 616,053, Feb. 14, 1967, abandoned.

[30] Foreign Application Priority Data

Feb. 16, 1966 Italy ............... 14558/66

[52] U.S. Cl. ............... 526/17; 526/42; 526/227; 526/230; 526/344; 204/159.18
[51] Int. Cl.² ............... C08F 8/20
[58] Field of Search ............... 260/92.8 A

[56] References Cited

UNITED STATES PATENTS 3,535,220 10/1970 Kato ............... 260/92.8 AC
3,597,342 8/1971 De Vita et al. ............... 260/92.8 AC

FOREIGN PATENTS OR APPLICATIONS 1,325,466 1963 France ............... 260/92.8 AC Primary Examiner—John Kight, III
Attorney, Agent, or Firm—Karl F. Ross; Herbert Dubno

[57] ABSTRACT

A process for chlorinating vinyl polymers, especially vinyl chloride polymers (i.e. homopolymers and copolymers having a chlorine content of less than about 56.5% by weight) to increase the chlorine content (to a level preferably in excess of 60% by weight), wherein the vinyl chloride polymer is mixed in a powdered state with a minor proportion (in terms of the total mixture) of at least one chloroalkane (preferably 10 to 55 parts by volume in $cm^3$ per 100 parts by weight in grams of polymer and more generally 10 parts by weight to 85 parts by weight of the chloroalkane per 100 parts by weight of the polymer), and then chlorinating the mixture with molecular chlorine ($Cl_2$) at a temperature below the vetrification or vitreous-transistion temperature (second-order glass-transition temperature) of the polymer. The reaction can be carried out in the presence of small quantities of at least one free-radical-producing catalyst of the peroxide type (preferably tertiary-butylperpivalate or di-isopropylperoxidecarbonate) or in the presence of U.V. light. The polymer powder contains maximum of 0.2% by weight water; and the chloroalkane is trichloromethane (chloroform), tetrachloromethane (carbon tetrachloride), 1,1-dichloroethane and 1,2-dichloroethane.

14 Claims, 1 Drawing Figure

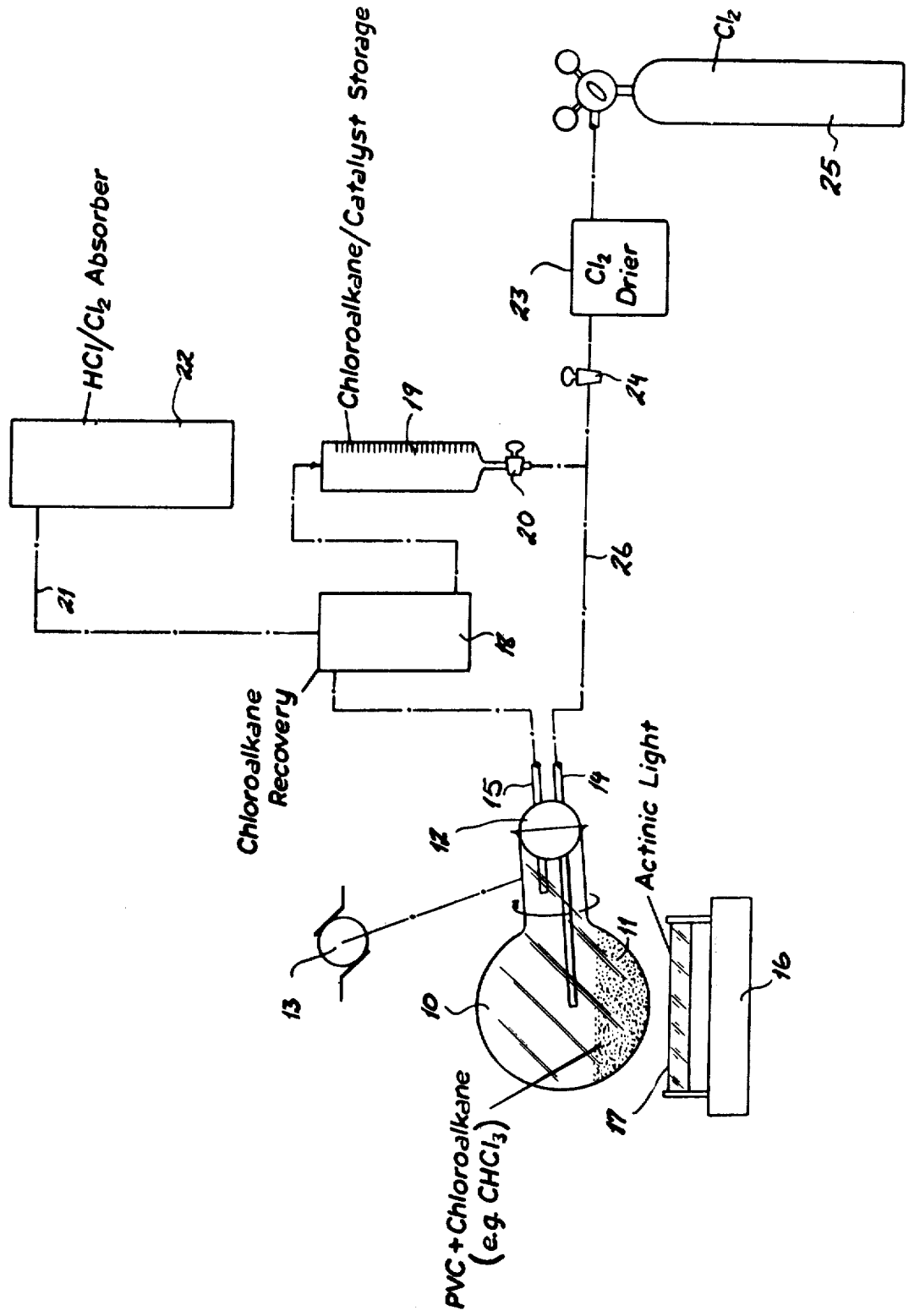

PROCESS FOR THE CHLORINATION OF VINYL POLYMERS

This application is a continuation of application Ser. No. 616,053 filed Feb. 14, 1967, now abandoned.

Our present invention relates to the chlorination of vinyl polymers and, more particularly, to the chlorination of vinyl-chloride homopolymers or copolymers.

It has already been proposed to chlorinate vinylchloride polymers to increase the quantity of chemically combined chlorine therein, thereby producing thermally suitable products whose physical characteristics are such as to permit the products to be used efficiently in conventional extrusion, molding and other processing equipment. Thus it has been suggested to chlorinate vinyl polymers after dissolving them in organic liquids capable of swelling vinyl chloride and thereby to obtain a relatively high degree of chlorination. The resulting products have even greater affinity for the solvents than do the starting materials and, consequently, the chlorination processes occur at relatively low rates, require high reaction temperatures and often give rise to products with poor thermal suitability and unsuitable for the production of heat-resistant articles. As the affinity toward solvents increases, it becomes increasingly difficult to recover polymeric materials of a high degree of chlorination from the organic liquid vehicle in which the reaction is carried out.

Another system, e.g. as described in our commonly assigned copending application Ser. No. 566,231, filed 19 July 1966 and entitled "PROCESS FOR THE HALOGENATION OF VINYL POLYMERS", provides for the chlorination of vinyl polymers in a chlorofluoroalkane vehicle having a tendency to swell the polymeric material to a substantial extent. Such suspension media may be constituted by a single chlorofluoro-hydrocarbon phase or heterogenous systems in which water or aqueous solutions of hydrochloric acid form one phase and an organic compound forms the other phase. While processes of the latter type may give rise to polymers having excellent thermal resistance, the processes have the significant technological disadvantage that large volumes of the suspension medium are required. The latter difficulty results in increased efforts for the recovery of the suspending medium, decreased reaction rates and an overall poor economy. Furthermore, the reactions may be difficult to control, involve complexities arising from the use of chlorofluorohydrocarbon and heterogenous systems, and may lead to serious corrosion of reaction vessels for recovery systems.

It is therefore the principal object of the present invention to provide an improved method of chlorinating vinyl polymers and especially vinyl-chloride homopolymers and copolymers in an efficient and inexpensive manner, obviating the disadvantages enumerated above.

Another object of our invention is to provide a relatively simple and effective process for the chlorination of vinyl-chloride homopolymers and copolymers so as to increase the chemically-combined chlorine content thereof.

A further object of our invention is to provide a process for the postchlorination of vinyl chloride homopolymers and copolymers which can be carried out effectively with a minimum alteration of the particulate character of the starting polymer and with minimum change of the particle dimensions.

Still another object of this invention is to provide an effective and inexpensive process for the chlorination of vinyl chloride polymers which permit the postchlorinated product to be recovered with a minimum of expense, effort and difficultly.

We have now found, surprisingly, that it is possible to obtain, by a postchlorination process as described in greater detail hereinafter, polymeric materials having a higher chlorine content (chemically combined) than vinyl-chloride polymers and copolymers prepared from monomeric components containing vinyl chloride, which materials evidence excellent thermal stability and relatively high softening temperatures, and are possessed of excellent self-extinction (flame quenching) properties by comparison with the starting material; the chlorinated product is, moreover, suitable for use in standard processing equipment (i.e. blenders, plasticizing apparatus, extrusion presses, molding machines and the like). The present invention resides in a method of chlorinating vinyl chloride polymers which involves the mixing of such polymers in a pulverulent or granular state with a minor proportion (in terms of the total mixture) of a chloroalkane and, preferably, a chloroalkane having a carbon number of 1 or 2, thereafter treating the mixture with molecular chlorine ($Cl_2$ gas) in the presence of a free-radical-producing-catalyzing system (e.g. actinic light). The reaction is carried out at a temperature below the vitrification or vitreous-transition temperature, also referred to hereinafter as the second-order glass-transition temperature, preferably at a temperature range between 0° and 55° C.

While substantially any vinylic polymer or copolymer may be chlorinated in the manner described, we have found that best results are obtainable and the reaction most effective with vinyl polymers containing vinyl chloride in chemically combined form. When the polymer is formed by polymerization, by conventional techniques, of vinyl chloride only, it is designated below a vinyl chloride "homopolymer" whereas polymers containing other monomeric substances in addition to vinyl chloride are termed vinyl chloride copolymers; thus the term vinyl chloride copolymer must be understood to identify copolymers of vinyl chloride with propylene, vinyl acetate, vinylidene chloride, acrylonitrile and acrylates, methacrylates, fumarates and polyblends of vinyl chloride polymers with other vinylic polymers, and graftpolymers of vinylic monomers to a vinyl chloride, homopolymers or copolymer backbone. Preferably, however, the vinyl chloride is a homopolymer prepared by conventional polymerization techniques using the suspension polymerization method and aqueous suspension systems; such homopolymers have a specific viscosity between 0.30 and 0.75 (preferably between 0.40 and 0.60) with a particle size ranging between 150 and 50 microns. Hereinafter, when reference is made to the specific viscosity of a polymer, it will be understood that the measurement is made in a 0.40% by weight/volume solution of the polymer in cyclohexanone at 25° C. Advantageously, the polymer is used in a particle mass having a particle-size distribution which may be established in accordance with ASTM-E11-61 standards with substantially no particles retained upon sieves of 40, 60, 80 and 100 U.S. mesh, 40% retained upon each of 140 and 200 mesh sieves, and 20% passing through the 200 mesh sieve. In general, the present invention operates most effectively with vinyl chloride polymers having less than about 56.5% by weight chemically combined chlorine and preferably a chlorine content of up to about 56.4% by weight, a specific gravity of about 1.4 gram per cc, a second-order glass-transition temperature of about 75° to 85° C, a VICAT-penetration temperature (measured at a load of 5 kg in oil with 1 mm penetration) and a mean porosity expressed in terms of a pore volume of 0.2 – 0.4 cc per gram and a mean pore diameter of 0.30 to 0.60 micron.

The reaction is catalyzed by any conventional chlorination-promoting system involving the generation of free radicals in the reaction mixture and it is, therefore, preferred to use photochemical means to effect this activation. Best results are obtained when the chlorine is substantially anhydrous and activation is effected by actinic light. In addition, or as an alternative, free-radical-forming substances may be incorporated in the reaction mixture to catalyze same. Such catalysts may be of the peroxide type, tertiary-butylperpivalate and diisopropylperoxidecarbonate being preferred. In general, the free-radical compound should have a high decomposition constant within the temperature range used for the chlorination step. The degree of chlorination can be controlled by varying the duration for which the reaction is permitted to continue. Suitable chloroalkanes, according to this invention, are the aforementioned alkanes with carbon numbers of 1 or 2 having at least two chlorine atoms; best results have been obtained with trichloromethane (chloroform), tetrachloromethane (carbon-tetrachloride), 1,-dichloroethane and 1,2-dichloroethane, Chloroform is, however, most economical and is preferred.

We have found that the quantity of the chloroalkane which is mixed with the vinyl chloride polymer, in accordance with the present invention, is important to optimum reaction rates and the production of products with durable characteristics. While different chloroalkanes and different vinyl chloride polymers will require different proportions in the mixture, it has been found that best results are obtained when 10 – 55 parts by volume (expressed in cc) of the chloroalkane are used with 100 parts by weight (expressed in grams) of the vinyl chloride polymer. The relationship given above emphasizes the fact that it is the volume of the chloroalkane per unit weight of the vinyl chloride which is the important factor here. Thus, when chloroform is employed as the chloroalkane, about 14 to 82 parts by weight of chloroform are used per 100 parts by weight of the vinyl chloride polymer. From a knowledge of the specific gravities of the other chloroalkanes the limiting proportions thereof by weight can be ascertained. Insufficient quantities of chloroalkane, with all other conditions equal, give poor reaction rates and yield a postchlorination product of poor thermal stability; conversely, excessive proportions of the chloroalkane have a tendency to swell the polymer so that the reaction mixture has poor flowability and incrustations form on the wall of the reaction vessel to give rise to inhomogeneous chlorination reactions; moreover, when the flowability of the reaction mixture decreases, it is difficult to recover the product in a powdery state. Preferably, 40 – 55 parts by volume of chloroform are used per 100 parts by weight of the vinyl chloride polymer. The chloroalkane is initially mixed with the polymeric material preferably at room temperature and in apparatus normally used for the formation of plastisols by mixing polyvinyl chloride and plasticizing agents, the chlorination following thereafter. While it is preferred to operate in the absence of any moisture, it has been observed that amounts of water up to 0.2% by weight in the reaction mixture can be tolerated.

The above and other features, objects and advantages of this invention will become more readily apparent from the following description, reference being made to the accompanying drawing, the sole FIGURE of which is a diagrammatic view of an apparatus for carrying out the present invention, and the following specific Examples which illustrate how the invention may be carried out in practice.

In the drawing, we show a reaction vessel 10 in the form of a flask supported for rotary movement about an axis inclined at an angle of 5° to the horizontal and driven by a motor 13 to steer the reaction mixture 11. The latter is composed of polyvinyl chloride and the chloroalkane (e.g. chloroform) as is exposed to free-radical activation by, for example, an actinic lamp 17 whose power supply is represented at 16. A ball or spherical seal 12 closes the neck of the flask 10 and is stationary, while supporting tubes 14 and 15 respectively serve to admit chlorine and other components to the reaction system and to lead gaseous effluents thereform. Thus, the tube 15 may communicate with one or more refrigerated condensers, represented at 18, which chloroalkane recovery is carried out, the chloroalkane being recycled to the reaction system or stored in a graduated cylinder 19 for subsequent addition to the reaction system. A stopcock 20 controls the flow of the chloroalkane or stored chemical catalyst into the line 27 which feed the mask 10 via tube 14. From the gaseous effluent, a line 21 conducts excess chlorine and hydrochloride evolved in the reaction to an absorber 22 containing an alkaline solution capable of picking up hydrogen chloride and chlorine. The chlorine supplied to the reaction system derives from a cylinder 25 or other source and passes through a dryer 23 of the absorbent or concentrated-sulfuric-acid type, the chlorine flow being controlled by valve 24. The operation of the system will become apparent in the discussion of the following Examples.

In the Examples, the term "thermal stability" is used to describe the properties of the vinyl polymers in terms of their response to two determinations:

a. According to ASTM D-793-49 standards, the quantity of hydrogen chloride evolved at 180° C in a nitrogen stream from 1 gram of polymer is determined for a heating time of up to 60 minutes. The slope of the graph of the quantity of HCl evolved, as a function of time is determined and represents the dehydrochlorination rate constant K = DHC, expressed in hours$^{-1}$. The greater the stability of the polymer to heating at this temperature, the lower will be the slope and this constant.

b. The time required for color change of the polymer to a "mustard color" and to an "amber color" is determined by heating the powdery polymer (without addition of thermal stabilizers) in aluminum vessels in an oven with air circulation at a temperature of 190° C.

The specific gravity, the glass-transition temperature, the self-extinguishing power and the VICAT penetration temperature of the chlorinated polyvinyl chloride all are found to increase with increase of the proportion of chlorine introduced into the polymer. Thus polymers of vinyl chloride postchlorinated to contain 68.2% by weight chemically combined chlorine are characterized by a specific gravity of 1.570 gr/cm³, a second-order glass-transition temperature of 140° C, and a thermal stability (D.H.C.) as above defined, of $0.280 \times 10^{-3}$ hrs$^{-1}$ (as compared with $1.620 \times 10^{-3}$ hrs$^{-1}$ for the starting polymer). It has, however, been surprisingly found that the molecular weights of the polymers, as determined by viscosity measurements, do not change appreciably and are practically equal to those of the starting polymers.

Preferably, the process of this invention is carried out in a reaction vessel which initially ensures a thorough mixing of the polymeric material with the chloroalkane and subsequently allows the continuous feeding of the gaseous chlorine flow as well as the simultaneous removal of the hydrogen chloride which is formed during the reaction. The activation is preferably obtained, as indicated earlier, by means of suitable lamps with photochemically active (actinic) light, particularly with a wavelength of 350 to 450 millimicrons. Alternatively, activation is effected by free-radical-producing catalysts dissolved in the chloroalkane before the treatment of the polymeric material, or continuously added throughout the course of the chlorination reaction in the form of a concentrated solution in a suitable solvent. At the end of the chlorination reaction the excess of chlorine and hydrochloric acid are removed by passing nitrogen through the stirred powdery mass.

Thereafter the chloroalkane is removed either by simple distillation or by distillation under reduced pressure under a nitrogen stream.

The polymeric powder thus obtained is then treated with an aqueous solution of $NaHCO_3$, in order to eliminate traces of acidity, and subsequently filtered; the polymer powder is then washed with a solvent such as methanol, in order to remove traces of the chloroalkane.

Upon elimination of the chloroalkane, the average dimensions of the particles of the chlorinated polymeric material of the present invention as well as the particle-size distribution resume the values of the starting products.

To demonstrate the suitability of the product for use in conventional equipment, it is merely necessary to note that a rigid vinyl sheet can be extruded by a millroll system using a temperature range of 180° C to 220° C when the postchlorinated polyvinylchloride has a chlorine content of 56.7 to 70% by weight. The chlorinated polymeric materials prepared with the process according to this invention may be plasticized in the same way as the normal vinyl polymers and copolymers, although not always with equal effect. Molding compositions using the chlorinated polymeric materials of this invention, may be obtained by mixing the same polymeric materials with conventional additives such as fillers, stabilizers, plasticizers, dyes, pigments, lubricating and parting or release agents, which are used for normal polyvinylchloride.

EXAMPLE I

The starting polyvinyl compound was SICRON 548 FM (Trademark), a commercial polyvinylchloride of high porosity (produced by the suspension method of Societa Edison, Azienda Chimica, Milan, Italy) having the following characteristics:

| | | |
|---|---|---|
| Specific viscosity at 25° C | = | 0.467 |
| Porosity of the particles: | | |
| a) mean volume of the pores | = | 0.27 cc/gram |
| b) mean diameter of the pores | = | 0.48 microns |
| Particle sizes: | | |
| % retained on a sieve (U.S. standard) of | | 40 mesh = 0 |
| % retained on a sieve (U.S. standard) of | | 60 mesh = 0 |
| % retained on a sieve (U.S. standard) of | | 80 mesh = 0 |
| % retained on a sieve (U.S. standard) of | | 100 mesh = 0 |
| % retained on a sieve (U.S. standard) of | | 140 mesh = 41 |
| % retained on a sieve (U.S. standard) of | | 200 mesh = 40 |
| % passing through a sieve of | | 200 mesh = 19 |
| Specific gravity 20°/20° C | | 1.40 – 1.41 gram/cm³ |
| Chlorine content (method Schoeniger) | | 56.4% by weight |
| Value of the dehydrochlorination DHC constant at 180° C under nitrogen | = | $1.620 \cdot 10^{-3}$ hrs$^{-1}$ |
| Technological thermal stability at 190° C - "mustard color" | = | 30 min. |
| Technological thermal stability at 190° C - "amber color" | = | 100 min. |
| Second order glass-transition temperature Tg | = | 81° C |
| VICAT penetration temperature | = | 87° C |

This polymer was chlorinated in an apparatus constituted essentially as illustrated in the accompanying drawing. The rotating part was a reaction flask (the Examples given hereunder were carried out using two flasks of different capacity, namely of 2 and 20 liters, respectively), having its rotational axis inclined at 5° to the horizontal. The flask, driven by an electric motor, revolved at the speed of 38 revolutions/min for the 2-liter flask and 19 revolutions/min for the 20-liter flask, respectively.

The fixed part connected to the rotating part through a spherical, perfectly tight joint, was constituted by the chlorine-feeding conduit system, by a series of refrigerating condensers suited for condensing and re-cycling the chloroalkane vapors, and by a graduated cylinder which acted as a reserve tank for the chloroalkane or as a tank for the catalytic solution.

The excess of chlorine and hydrochloric acid developed during the reaction, was passed into a NaOH-solution absorber.

The rotating 2-liter flask described above was flushed initially with a nitrogen stream; after flushing 200 grams of the polyvinylchloride were introduced as described above, in the form of a powder. Stirring was started by rotation of the vessel and 80 parts by volume (40 parts by volume or 59.4 parts by weight per 100 parts by weight of polymer) of chloroform were slowly fed in at a temperature of 23° C. After termination of the feed of chloroform, the flask was rotated for a further period of 70 min.

Thereupon a flow of dry chlorine was fed into the flask so that it reacted with the powdery mass, operating in the presence of photochemically active (actinic) light from a 125 Watt Wood-type lamp.

The chlorination reaction was carried out at a temperature of 30° C for a period of 3 hours, whereupon the supply of chlorine was stopped, the lamp was switched off and the polyvinylchloride, thus further chlorinated as previously indicated, was recovered.

The final product had the following characteristics:

| | | |
|---|---|---|
| Specific viscosity at 25° C | = | 0.463 |
| Chlorine content | = | 65% by weight |
| Particles sizes | | |
| % retained on a sieve (U.S. standard) of | | 40 mesh 0 |
| % retained on a sieve (U.S. standard) of | | 60 mesh 0 |
| % retained on a sieve (U.S. standard) of | | 80 mesh 0 |
| % retained on a sieve (U.S. standard) of | | 100 mesh 1 |
| % retained on a sieve (U.S. standard) of | | 140 mesh 52 |
| % retained on a sieve (U.S. standard) of | | 200 mesh 35 |
| % passing through a sieve of | | 200 mesh 12 |
| Specific gravity 20°/20° C gr/cm³ | | 1.535 |
| VICAT penetration temperature | = | 128° C |
| Thermal stability value of the D.H.C. constant | = | 0.37×10⁻³ hr.⁻¹ |
| Technological thermal stability at 190° C "mustard color" | = | 60 min. |
| Technological thermal stability at 190° C "amber color:" | = | 140 min. |

EXAMPLE II

The equipment used in Example I was used with a polyvinylchloride of the same type.

Under the same conditions as those of Example I but with chlorination times of respectively 2 and 4 hours, two types of postchlorinated polyvinylchloride were obtained, the properties of which are summarized in the following table:

| | Reaction time | |
|---|---|---|
| | 2 hours | 4 hours |
| Specific viscosity at 25° C | 0.468 | 0.465 |
| Chlorine | 64% | 68.2% |
| Specific gravity 20°/20° C | 1.52 gr/cm³ | 1.57 gr/cm³ |
| VICAT penetration temperature | 122° C | 146° C |
| Dehydrochlorination, D.H.C. constant at 180° C (hrs⁻¹) | 0.480 × 10⁻³ | 0.280 × 10⁻³ |
| Second order glass-transition temperature, Tg, in ° C | 108 | 140 |
| Technological thermal stability: | | |
| "mustard color" at 190° C | 50 min. | 90 min. |
| "amber color" at 190° C | 30 min. | > 140 min |

It thus may be seen that with an increase of the duration of the chlorination reaction, there is an increase in the chemically combined chlorine in the post-chlorinated vinylchloride. There is also a considerable increase in thermal stability and in the VICAT penetration temperature.

EXAMPLE III

Using similar equipment as that used in Example I and polyvinylchloride of the same type, the process was carried out with different weight/volume ratios of polyvinylchloride/chloroform and consequently different reaction times to obtain dry powdery mixtures of polymer and chloroform.

The reaction conditions are summarized in Table I:

TABLE I

| Test | A | B | C | D |
|---|---|---|---|---|
| Sicron 548 FM (grams) | 200 | 200 | 200 | 200 |
| CHCl₃ (cc) | 0 | 10 | 55 | 85 |
| CHCl₃ (grams) | 0 | 14.9 | 81.7 | 126.2 |
| Time to dry-powder mixture - (min) | — | 10 | 50 | 70 |
| Chlorination time - (hrs) | 4 | 4 | 4 | 4 |
| Chlorination temperature (° C) | 26 | 28 | 25 | 25 |

In Table II, the properties of the postchlorinated polymers produced are reported:

The results obtained in both tests are summarized in the following Table:

TABLE II

| Test | A | B | C | D |
|---|---|---|---|---|
| Chlorine (% by weight) | 59 | 61.7 | 63.5 | 67.2 |
| Specific viscosity | 0.441 | 0.450 | 0.460 | 0.465 |
| Specific gravity 20°/20° C (gr/cm³) | 1.455 | 1.490 | 1.510 | 1.560 |
| *Tg (°C) | 88 | 93 | 101 | 131 |
| VICAT penetration temperature (° C) | 95 | 103 | 116 | 140 |
| Thermal stability: dehydrochlorination DHC (hrs.⁻¹) | $1.330 \times 10^{-3}$ | $1.030 \times 10^{-3}$ | $0.680 \times 10^{-3}$ | $0.370 \times 10^{-3}$ |
| Technological thermal stability: | | | | |
| "mustard color" | 15 min. | 30 min. | 40 min. | 70 min |
| "amber color" | 80 min. | 100 min. | 110 min. | 140 min. |

*Second-order glass-transition temperature.

TABLE III

| Test | E | F |
|---|---|---|
| Specific gravity 20°/20° C (gr/cm³) | 1.510 | 1.555 |
| Chlorine (% by weight) | 63.3 | 67.0 |
| Specific viscosity | 0.467 | 0.462 |
| Porosity: | 0.16 | 0.15 |
| pore volume (cc/gr) | | |
| pore diameter (microns) | 0.70 | 0.70 |
| VICAT penetration temperature (° C) | 118 | 142 |
| Glass-transition temperature Tg (° C) | 102 | 130 |
| Thermal stability: dehydrochlorination DHC (hrs.⁻¹) | $0.460 \times 10^{-3}$ | $0.200 \times 10^{-3}$ |
| Technological thermal stability: | | |
| "mustard color" | 50 min. | 90 min. |
| "amber color" | more than 140 min. | more than 140 min. |

From the results obtained, it will be seen that an increase of the quantity of the chloroalkane such as chloroform, the other conditions remaining the same, considerably increases the chlorination rate (and consequently the quantity of chemically combined chlorine), and thus gives products with better resistance to chemical attack and thermal stability.

EXAMPLE IV

Using the aforedescribed reaction vessel of 20-liter capacity, tests were carried out under different conditions with different ratios of reactants.

In Test E: 1000 grams of SICRON 548 FM in the form of a powder were mixed with 400 cc (594 grams) CHCl₃ at 23° C for a period of 3 hours, i.e. until the powdery mixture reached the dry state. Thereupon the chlorination was carried out by the procedures previously described with activation by an ultraviolet lamp of the high-pressure mercury type. The chlorination reaction was carried out over a period of 4 hours at a mean temperature of 16° C.

Test F: The same reaction conditions were employed except for the reaction time, which in this test was 6 hours.

EXAMPLE V

Following the procedure of Example I and using a reaction vessel of 2-liter capacity, but substituting for the photochemical activation, free-radical peroxide catalysis, several tests were carried out under different reaction conditions with different peroxidic catalysts and with different temperatures:

Test G: 300 grams of SICRON 548 FM in powdery form was introduced into the flask and 120 cc of CHCl₃ (178.2 grams), which contained 3 grams of dissolved t-butylperpivalate. Thereupon the two components were stirred for 85 minutes, (i.e. until a perfectly dry powder was obtained) at 15° C.

Thereupon chlorination was commenced as previously described and, after 4 hours of reaction at 45° C, a product was obtained with characteristics as reported in Table IV.

Test H: Same as test G but using as catalyst 3 grams of di-isopropylperoxidicarbonate dissolved in chloroform. After 4 hours of reaction at 36° C a chlorinated polymer was obtained the characteristics of which are reported in the following Table:

TABLE IV

| Test | G | H |
|---|---|---|
| Specific gravity 20°/20° C (gr/cm³) | 1.535 | 1.560 |
| Chlorine (% by weight) | 65.2 | 67.3 |
| Specific viscosity | 0.460 | 0.466 |
| Porosity: | | |
| pore volume (cc/gr) | 0.11 | 0.11 |
| pore diameter (microns) | 0.66 | 0.70 |
| VICAT penetration temperature (° C) | 127 | 143 |
| Glass transition temperature (° C) | 111 | 131 |
| Thermal stability: dehydrochlorination DHC (hrs⁻¹) | $0.490 \times 10^{-3}$ | $0.450 \times 10^{-3}$ |
| Technological thermal stability: | | |

EXAMPLE VI

The starting polymer was SICRON 945, a copolymer of vinyl chloride and vinylacetate, containing 5% of chemically combined vinylacetate, prepared by the suspension method having the following characteristics:

| | |
|---|---|
| Specific viscosity at 25° C | 0.495 |
| Specific gravity 20°/20° C (gr/cm³) | 1.398 |
| Chlorine (% by weight) | 55.2 |
| Particle sizes: | |
| % retained on a sieve of 40 mesh | 0 |
| % retained on a sieve of 60 mesh | 0 |
| % retained on a sieve of 80 mesh | 1 |
| % retained on a sieve of 100 mesh | 2 |
| % retained on a sieve of 140 mesh | 40 |
| % retained on a sieve of 200 mesh | 25 |
| % passing through sieve of 200 mesh | 32 |
| VICAT penetration temperature (° C) | 85 |
| Glass-transition temperature Tg (° C) | 78 |
| Thermal stability: | |
| dehydrochlorination DHC (hrs⁻¹) | $1.460 \times 10^{-3}$ |
| Technological thermal stability: | |
| "mustard color" | 25 min. |
| "amber color" | 50 min. |

Using the method of Example 1 with a 20-liter reaction vessel and 100 grams of the copolymer mixed with 400 ml (594 grams) of chloroform, chlorination was effected with dry gaseous chlorine, at a temperature of 20° C, for a reaction time of 4 hrs.

The reaction was activated by irradiation with a 70-Watt high-pressure mercury U.V. lamp.

The chlorinated product thus obtained had the following properties:

| | |
|---|---|
| Specific viscosity at 25° C | 0.455 |
| Specific gravity 20°/20° C (gr/cm³) | 1.540 |
| Chlorine (% by weight) | 63.0 |
| Particles sizes | |
| % retained on a sieve of 40 mesh | 0 |
| % retained on a sieve of 60 mesh | 0 |
| % retained on a sieve of 80 mesh | 4 |
| % retained on a sieve of 100 mesh | 5 |
| % retained on a sieve of 140 mesh | 48 |
| % retained on a sieve of 200 mesh | 22 |
| % passing through a sieve of 200 mesh | 21 |
| VICAT penetration temperature (° C) | 110 |
| Glass transitin temperature Tg (° C) | 100 |
| Thermal stability: | |
| dehydrochlorination DHC (hrs⁻¹) | $0.450 \times 10^{-3}$ |
| Technological stability at 180° C | |
| "mustard color" | 40 min. |
| "amber color" | 110 min. |

From the above cited data it can be seen that improvements of the thermal stability and resistance to heat can be achieved by chlorination of a vinylchloride — vinylacetate copolymer.

EXAMPLE VII

Following the procedures described in the previous Examples a propylene — vinylchloride copolymer containing about 4% of chemically combined propylene was chlorinated starting in a mixture of 1200 grams of the polymer and 400 ml (594 grams) of chloroform.

The reaction temperature was 20° C, the reaction duration was 4 hrs. and the activation was carried out with the U.V. lamp described in Example VI.

In the following Table the properties of both the "unchlorinated" and postchlorinated copolymers are reported:

| | "Unchlorinated" copolymer | Chlorinated copolymer |
|---|---|---|
| Specific viscosity at 25° C | 0.345 | 0.327 |
| Specific gravity 20°/20° C (gr/cm³) | 1.387 | 1.523 |
| Chlorine (% by weight) | 55.3 | 63.8 |
| Particle Distribution | | |
| % retained on a sieve of 40 mesh | 0 | 0 |
| % retained on a sieve of 60 mesh | 0 | 0 |
| % retained on a sieve of 80 mesh | 9 | 18 |
| % retained on a sieve of 100 mesh | 18 | 27 |
| % retained on a sieve of 140 mesh | 59 | 50 |
| % retained on a sieve of 200 mesh | 10 | 4 |
| % passing through a sieve of 200 mesh | 4 | 1 |
| VICAT penetration temperature (° C) | 83 | 117 |
| Glass transition temperature Tg (° C) | 74 | 106 |
| Thermal stability | | |
| dehydrochlorination DHC (hrs⁻¹) | $1.430 \times 10^{-3}$ | $0.510 \times 10^{-3}$ |
| Technological stability: | | |
| "mustard color" (min.) | 10 | 30 |
| "amber color" (min.) | 40 | 70 |

We claim:

1. A process for chlorinating a vinyl-chloride polymer in a powdered state, comprising the steps of:
   mixing the powder with a least one liquid chloroalkane present in an amount ranging between 10 and 55 parts by volume in cm³ per 100 parts by weight in grams of said polymer and under substantially anhydrous conditions with at most 0.2% by weight H₂O; and
   subjecting the resulting substantially anhydrous mixture in powder form to treatment with gaseous chlorine while catalytically activating the system at a temperature below the vitreous-transition temperature of the polymer.

2. The process defined in claim 1 wherein said temperature of the reaction mixture is maintained between 0° and 55° C during the chlorination reaction.

3. The process defined in claim 1 wherein said chloroalkane is chloroform.

4. The process defined in clam 1 wherein said mixture includes at least one free-radical catalyst of the peroxide type.

5. The process defined in claim 4 wherein said peroxide-type compound is tertiary-butylperpivalate or di-isopropylperoxidecarbonate.

6. The process defined in claim 1 wherein the reaction is catalyzed by ultraviolet light.

7. The process defined in claim 1 wherein said powder has a chlorine content of less than 56.5% by weight prior to chlorination and the reaction is carried out with the addition of chlorine to the reaction mixture for a period of time to raise the chlorine content to substantially in excess of 60% by weight of the polymer or copolymer.

8. A method of dry chlorination of polyvinyl chloride with gaseous chlorine comprising the steps of admixing powdered polyvinyl chloride and liquid chloroalkane selected from the group which consists of chloroform and carbon tetrachloride while still retaining a dry mixture of said polyvinyl chloride and chloroalkane, said chloroalkane being present in an amount of 10 to 55 parts by volume (expressed in cubic centimeters) to 100 parts by weight (expressed in grams) of said polyvinyl chloride, said chloroalkane being substantially completely absorbed by said polyvinyl chloride, chlorinating said mixture at a temperature in the range of from about 0° C and 55° C in the presence of actinic light energy, and removing said chloroalkane from the final chlorinated stock.

9. A method according to claim 8, characterized in that said chloroalkane is an aliphatic chlorinated compound having a boiling point below the degradation temperature of the chlorinated product obtained.

10. A method according to claim 9, wherein the boiling point of said chloroalkane is below the softening point of the chlorinated product obtained.

11. A method according to claim 9, wherein the chloralkane consists of a mixture of chlorinated hydrocarbons.

12. A method according to claim 8, wherein said dry mixture is prepared by mixing, at room temperature, the starting polyvinyl chloride with the chloroalkane.

13. A method according to claim 8 wherein the liquid chloroalkane is chloroform.

14. A method according to claim 8 wherein the liquid chloroalkane is carbon tetrachloride.

* * * * *